Dec. 8, 1931.  N. H. WILLBY  1,835,548
DYNAMIC BRAKING SYSTEM
Filed March 19, 1929
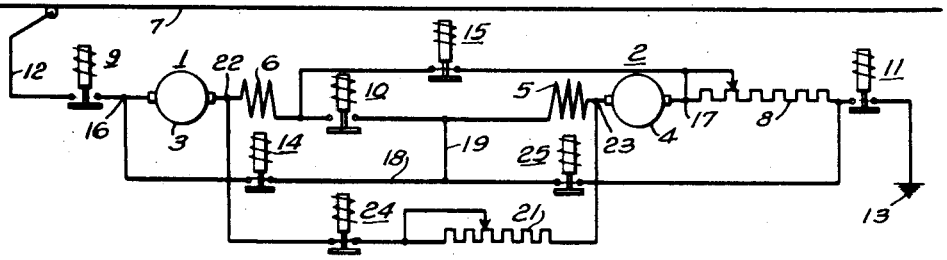
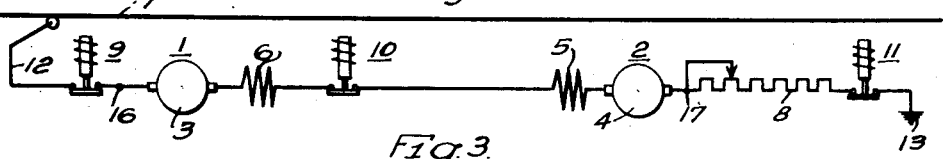
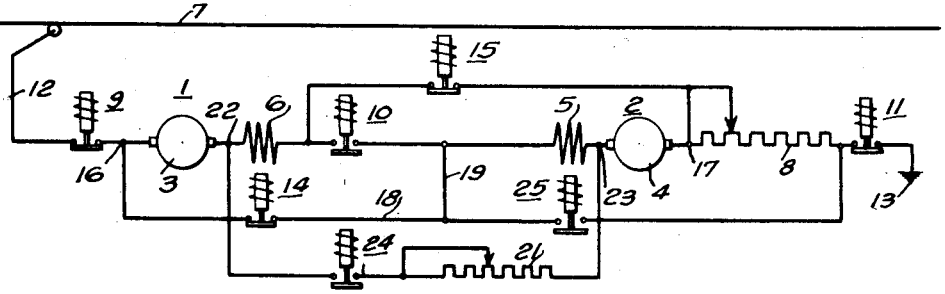
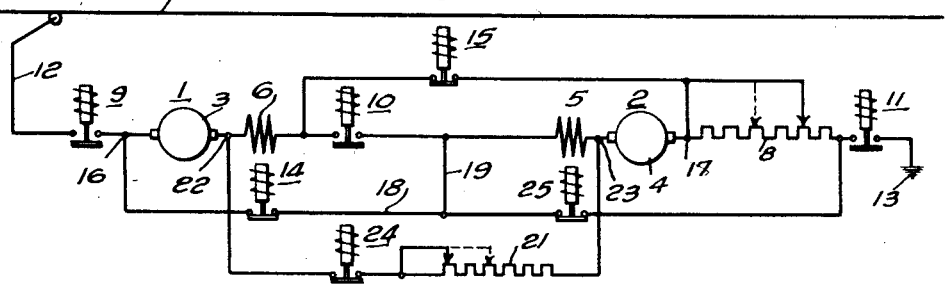
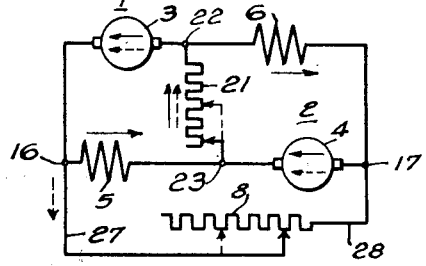
INVENTOR
Norman H. Willby.
BY
ATTORNEY Patented Dec. 8, 1931

1,835,548

UNITED STATES PATENT OFFICE

NORMAN H. WILLBY, OF WILKINSBURG, PENNSYLVANIA, ASSIGNOR TO WESTINGHOUSE ELECTRIC & MANUFACTURING COMPANY, A CORPORATION OF PENNSYLVANIA

DYNAMIC BRAKING SYSTEM

Application filed March 19, 1929. Serial No. 348,268.

My invention relates generally to motor-control systems and particularly to dynamic-braking systems.

An object of the invention is to provide a dynamic-braking system for traction or propelling motors that shall be simple in construction and efficient in its operation.

Another object of the invention is to provide for obtaining the dynamic-braking of traction or propelling motors that shall effect smooth deceleration of a vehicle irrespective of its speed.

For a fuller understanding of the invention, reference may be had to the following description, taken in conjunction with the accompanying drawings, in which Figure 1 is a diagrammatic view of circuits and apparatus arranged in accordance with the invention.

Fig. 2 is a diagrammatic view of the circuit connections of a pair of traction motors connected in series-circuit relation across a source of power supply.

Fig. 3 is a diagrammatic view of the circuit connections of the motors when connected in parallel-circuit relation across a source of power supply.

Fig. 4 is a diagrammatic view of the circuit connections utilized for obtaining dynamic braking of two propelling or traction motors, and Fig. 5 is a diagrammatic view of a modification of the circuit connections shown in Fig. 4.

Referring now to the drawings, motors 1 and 2 are of a type suitable for propelling a vehicle, such for example, as a street-railway car (not shown). The particular motors shown are of the series type having armature windings 3 and 4 and series field windings 6 and 5, respectively. As shown, the field winding 5 of the motor 2 is arranged to be traversed by current flowing through the armature 4 of the motor 2, and the field winding 6 of the motor 1 is disposed to be traversed by current flowing through the armature 3 of the motor 1. The connections just discussed always obtain during acceleration and normal full-speed operation, but, during deceleration, the field windings are connected otherwise than here specified, as will be pointed out more in detail hereinafter.

The motors 1 and 2 may be connected, for operation as motors, to a trolley conductor 7 which is supplied with electric power from a suitable power source (not shown).

In order to accelerate the vehicle, (not shown), propelled by the motors 1 and 2, from rest to full running speed or to any desired intermediate speed, a starting resistor 8 is provided for controlling the motor currents. As shown, the resistor 8 is variable and may be varied from a maximum to a minimum value, as is the usual practice in controlling the speed of operation of electric motors.

When accelerating a motor-propelled vehicle from rest, it is the usual practice to connect the motors in series-circuit relation with a starting resistor and then across the source of power supply. In this instance, electromagnetic switches 9, 10 and 11 are provided for connecting the motors 1 and 2, in series-circuit relation with the starting resistor 8 and to the trolley conductor 7. When the switches 9, 10 and 11 are closed, a series motor circuit is established which extends from the trolley conductor 7, through conductor 12, the contact members of the switch 9, motor armature 3, series field winding 6, the contact members of the switch 10, series field winding 5, armature winding 4 of the motor 2, the starting resistor 8 and the contact members of the switch 11, to ground at 13.

In order to accelerate the vehicle to its maximum running speed for the series motor connection, sections of the resistor 8 may be successively shunted in steps of any suitable number, until full voltage is impressed across the motors, but it is to be understood that the shunting means in no case short-circuits the resistor 8. At least one resistor section of the resistor 8 always remains in circuit with the motors 1 and 2, regardless of whether these motors are connected in series-circuit relation or in parallel-circuit relation.

When full running speed for the series motor connection is reached, the motors 1 and 2 may be connected in parallel-circuit relation to each other and in series-circuit relation with the starting resistor 8 and then across the power supply represented by the trolley 7 and ground at 13. In order to establish the parallel motor-circuit connections, electromagnetic switches 14 and 15 are provided. In the transition from the series motor connections to the parallel motor connections, switch 14 is first closed, and the armature 3 and the field winding 6 are shunted. In such case, only the motor 2 develops tractive effort. When the switch 14 is closed, the switch 10 may be opened and the switch 15 closed. When the switches 14 and 15 stand closed and the switch 10 open, the motors 1 and 2 are connected in parallel-circuit relation, and in series-circuit relation with starting resistor 8.

The parallel motor circuits are best illustrated in Fig. 3. The circuit for motor 1 extends from the trolley conductor 7, through conductor 12, the contact members of the switch 9, junction point 16, motor armature 3, field winding 6, the contact members of switch 15, junction point 17, resistor 8 and the contact members of the switch 11, to ground at 13. The circuit for motor 2 may be traced from the junction point 16, through the contact members of the switch 14, conductors 18 and 19, the field winding 5, armature winding 4 of the motor 2, resistor 8 and the contact members of the switch 11, to ground at 13.

The speed of the motors, when connected in parallel-circuit relation, may be increased to full running speed by shunting or bridging successive sections of resistor 8.

In order to utilize the dynamic braking of the motors 1 and 2 for decelerating the vehicle, a variable resistor 21 is provided. It is to be understood, that the dynamic-braking action is not initiated until after the switches 9 and 11 have been opened to disconnect the motors from the power supply. However, switches 14 and 15 are held closed in order to maintain the parallel-circuit connection of the motors.

When the motors 1 and 2 are disconnected from the power source, the switches 14 and 15 being closed, two local parallel circuits are established which extend, respectively, from the junction point or power terminal 16, through the armature 3, field winding 6, the contact members of switch 15, to the junction point or power terminal 17, and from the junction point or power terminal 16, through the contact members of switch 14, conductors 18 and 19, field winding 5 and armature 4, to the junction point or power terminal 17.

When the power supply has been disconnected from the motors and the local parallel circuits, established, the resistor 21 may be connected between junction points 22 and 23, by means of an electromagnetic switch 24. When the resistor 21 is so connected, the field winding 6 is connected across the armature of motor 2, and the field winding 5 is connected across the armature 3 of motor 1.

Assuming that the vehicle is coasting and thereby driving the motors 1 and 2 by its momentum then the motors 1 and 2 will be operated as generators. When the motors are functioning as generators, two local circuits are established through the resistor 21 and the motors. One of these local circuits may be traced from the junction point 22, through the field winding 6, in the direction indicated by the arrow, the armature winding 4 of the motor 2, the junction point 23 and the resistor 21, to the junction point 22. The other local circuit may be traced from the junction point 22, through the armature 3 of the motor 1, the field winding 5, junction point 23 and the resistor 21, back to the junction point 22. The current in the field windings 5 and 6 when the motors are acting as generators, is in the same direction as when the motors are acting as motors, but the current in the armatures 3 and 4 is reversed; therefore, it follows that the machines 1 and 2 are acting as generators.

The dynamic-braking action may be increased by shunting or bridging successive sections of the resistor 21. By decreasing the value of the resistance between the junction points 22 and 23, the current in the field windings and armatures will increase; hence a greater, dynamic-braking force is developed for decelerating the vehicle.

In order to better control or regulate the dynamic braking of the motors 1 and 2, the resistor 8 is connected across the power terminals 16 and 17 of the motors 1 and 2 when connected in parallel-circuit relation, (see Figs. 4 and 5).

In order to connect the resistor 8 across the power terminals of the motors, when connected in parallel, a switch 25 is provided.

In order that the dynamic braking of the motors 1 and 2, may be controlled and gradually increased, from a low value the resistance between the junction points 22 and 23 should be at a maximum, to start, that is, all of the resistors 21 should be connected across the points 22 and 23, and the resistance between the power terminals 16 and 17 a minimum, that is, all the resistor sections, except one, of the resistor 8 should be shunted as shown in Fig. 5.

When the resistor 8 is connected as shown in Fig. 5, current will flow from the power terminal 16, through conductor 27, in the direction indicated by the arrow, conductor 28, terminal 17, the armature 4 of motor 2, resistor 21, junction point 22, and the armature 3 of motor 1, back to the terminal 16.

Since the initial voltage between the terminals 16 and 17 is relatively high when the dynamic braking begins to take place, or is initiated, the current flowing between the terminals will be of a relatively high value. Therefore, the voltage drop across the resistor 21 will be a relatively high value, and, accordingly, the current in the field windings 5 and 6 will be decreased to a relatively low value. Therefore, the dynamic-braking action of the motors will be of a relatively low value.

To increase the braking action, sections of the resistor 8 may be gradually reconnected in steps, of any predetermined number, across the terminals 16 and 17 to thereby reduce the flow of current between the power terminals. By decreasing the current flow between the terminals 16 and 17, the voltage drop across the resistor 21 is decreased. As the voltage drop decreases across the resistor 21, the current, through the field windings 5 and 6 will increase to thereby increase the dynamic-braking action. To further increase the dynamic braking action, the resistor 8 may be disconnected from the junction points or power terminals 16 and 17.

To still further increase the dynamic braking action, sections of the resistor 21 may be gradually bridged or shunted in order that the resistance between the terminals or junction points 22 and 23 may be decreased. As stated above, if the resistance between the terminals or junction points 22 and 23 is decreased, the current through the field windings 5 and 6 increases to further increase the dynamic braking of the motors.

Since the field windings 5 and 6 are inherently highly inductive, the current through the field windings will change gradually in response to the various changes or adjustments of the resistors 8 and 21. Therefore, the change in dynamic braking resulting from the step-by-step operation of the resistor will be gradual and prevent jerking of the vehicle during deceleration.

While the resistors 8 and 21 have been illustrated as variable, it is to be understood that various means well known in the art, may be utilized for effecting adjustment in effective voltage drop from points 11 to 13 to thereby vary the dynamic-braking effort of the motors 1 and 2.

While the magnetic switches 9, 10, 11, 14, 15, 24 and 25 have been illustrated without the usual master controller for controlling their operation, it is to be understood that any controller, known in the art for controlling the sequence and operation of magnetic switches, may be employed. It is merely for the purpose of simplifying the description of the invention that a controller has not been shown for actuating the switches.

Various modifications may be made in the dynamic-braking systems herein disclosed without departing from the spirit and the scope of the invention. It is desired, therefore, that the invention, as herein disclosed, shall be interpreted in an illustrative, and not in a limiting sense.

I claim as my invention:

1. In a dynamic-braking system for motors, in combination, two series motors provided with field and armature windings, means for connecting the motors in series-circuit relation to provide a closed series circuit, a variable resistor and connecting means therefor for connecting the field winding of one motor across the armature winding of the other to provide local circuits to effect dynamic braking of the motors, means for connecting said motors in parallel circuit relation, and a variable resistor disposed to be connected across the motors when said motors are connected in parallel circuit relation to control the braking effort resulting from the establishment of the local circuits.

2. In a dynamic-braking system for motors, in combination, two series motors provided with field and armature windings, means for connecting the motors in series-circuit relation to provide a closed series circuit, a resistor and connecting means therefore for connecting the field winding of one motor across the armature winding of the other to provide local circuits to effect dynamic braking of the motors, means for connecting said motors in parallel relation, a resistor disposed to be connected across the motors when said motors are connected in parallel circuit relation to control the braking effort resulting from the establishment of the local circuits, and means for varying said resistors to thereby further control the braking effort resulting from the establishment of said local circuits.

3. In combination, a pair of motors provided with field and armature windings, said armature and field windings being connected together in a local series circuit, a source of power, means for connecting said local series circuit to the source of power to effect motor operation, a pair of resistors, and means disposed to so connect said resistors to said local circuit, when the source of power is disconnected from the local circuit, that the field winding of each motor is connected across the armature winding of the other through one of said resistors and the armature windings are connected in a closed circuit extending through both of said armature windings and both of said resistors, to thereby establish dynamic-braking action by the motors.

4. In combination, a pair of motors provided with armature and field windings, said armature and field windings being connected together in a local series circuit, a source of power, means for connecting said local series circuit to the source of power to effect motor operation, a pair of resistors, and means disposed to so connect said resistors to said local circuit, when the source of power is disconnected from the local circuit, that the field winding of each motor is connected across the armature winding of the other through one of said resistors, and the armature windings are connected in a closed circuit extending through the armatures and both of said resistors to establish braking action by the motors, and means for varying said resistors.

5. In a motor-control system, in combination, a source of power supply, a pair of motors provided with field and armature windings, means for connecting the field and armature windings of said motors in a closed local series circuit, means for connecting said local series circuit to the source of power supply to establish motor action, means for disconnecting said source of power, and means for effecting dynamic-braking action, comprising a plurality of resistors, one of which is connected to so bridge said local circuit that the field winding of each motor is connected across the armature winding of the other and another of which is so connected to bridge said local circuit that a closed circuit is established extending through said armature windings and said resistors.

6. In a motor-control system, in combination, a source of power supply, a pair of motors provided with field and armature windings, means for connecting the field and armature windings of said motors in a closed local series circuit, means for connecting said local series circuit to the source of power supply to establish motor action, means for disconnecting said source of power, and means for effecting braking action comprising a plurality of resistors, one of which is connected to so bridge said local circuit that the field winding of each motor is connected across the armature winding of the other and another of which is connected to so bridge said local circuit that a closed circuit is established including said armature windings and said resistors, and means for varying said resistors.

7. In combination, a plurality of motors provided with armature and field windings, means for connecting said windings in a closed series circuit, said series circuit having power-supply terminals, a source of power supply, means for connecting said source of power supply to said power-supply terminals to effect motor action, and means for utilizing said local circuit to establish braking action when the power supply is disconnected comprising a plurality of resistors, one of said resistors being arranged to connect the field winding of each motor across the armature winding of the other, and another of said resistors being connected to said power-supply terminals of said local series circuit.

8. In combination, a plurality of motors having armature and field windings, means for connecting said windings in a closed series circuit, said circuit having power-supply terminals, a source of power supply, means for connecting said power supply to the power terminals to effect motor action, and means for utilizing said local circuit to establish braking action when the power supply is disconnected comprising a plurality of resistors, one of said resistors being arranged to connect the field winding of each motor across the armature winding of the other and another of said resistors being connected to said power-supply terminals of said local series circuit, and means for varying said resistors to thereby control the braking action.

In testimony whereof, I have hereunto subscribed my name this 12th day of March 1929.

NORMAN H. WILLBY.